United States Patent
Cox et al.

(10) Patent No.: US 8,843,590 B2
(45) Date of Patent: Sep. 23, 2014

(54) SYSTEMS, METHODS AND COMPUTER PROGRAM PRODUCTS FOR FACILITATING DISPLAY OF CONTENT WITHIN APPLICATION PROGRAMS EXECUTING ON ELECTRONIC DEVICES

(75) Inventors: Steve Cox, Durham, NC (US); David Spitz, Raleigh, NC (US); Matthew Squire, Raleigh, NC (US); Jay Thrash, Raleigh, NC (US); Tom Gordon, New York, NY (US); Xiaohu Guan, Chapel Hill, NC (US); Dana Borger, Cary, NC (US)

(73) Assignee: EBM/IP, LLC, Vienna, VA (US)

( * ) Notice: Subject to any disclaimer, the term of this patent is extended or adjusted under 35 U.S.C. 154(b) by 1673 days.

(21) Appl. No.: 09/860,401

(22) Filed: May 18, 2001

(65) Prior Publication Data
US 2002/0004855 A1  Jan. 10, 2002

Related U.S. Application Data

(60) Provisional application No. 60/208,943, filed on May 31, 2000.

(51) Int. Cl.
| | | |
|---|---|---|
| *G06F 15/16* | (2006.01) | |
| *G06Q 30/00* | (2012.01) | |
| *H04L 29/08* | (2006.01) | |
| *G06Q 30/02* | (2012.01) | |
| *H04L 29/06* | (2006.01) | |

(52) U.S. Cl.
CPC ............... *H04L 67/20* (2013.01); *G06Q 30/02* (2013.01); *H04L 29/06* (2013.01); *H04L 67/36* (2013.01); *H04L 67/2823* (2013.01); *H04L 67/303* (2013.01); *H04L 67/306* (2013.01); *H04L 67/2814* (2013.01); *H04L 67/04* (2013.01); *H04L 67/2842* (2013.01); *H04L 67/10* (2013.01); *H04L 67/289* (2013.01); *H04L 69/329* (2013.01)
USPC .................... 709/219; 705/14.49; 705/14.51; 705/14.73

(58) Field of Classification Search
CPC .......... G06Q 30/0253; G06Q 30/0269; G06Q 30/0271; H04L 29/08711; H04L 29/089
USPC .............. 705/14, 26, 27, 14.49, 14.51, 14.73; 709/219, 227
See application file for complete search history.

(56) References Cited

U.S. PATENT DOCUMENTS

| | | | | |
|---|---|---|---|---|
| 5,347,632 | A | * | 9/1994 | Filepp et al. .................. 709/202 |
| 5,727,159 | A | * | 3/1998 | Kikinis .......................... 709/246 |

(Continued)

FOREIGN PATENT DOCUMENTS

| | | | | |
|---|---|---|---|---|
| EP | 0 752 678 A2 | 1/1997 | ............. | G06F 19/00 |

OTHER PUBLICATIONS

Kohda Y et al. "Ubiquitous advertisting on the WWW: Merging advertsement on the browser", Computer Networks and ISDN Systems, v.28, n.11, May 1996, pp. 1493-1499.*

(Continued)

*Primary Examiner* — Aaron Strange
(74) *Attorney, Agent, or Firm* — VIVICAR Law, PLLC

(57) ABSTRACT

An application program interface (API) is operably associated with application programs executing on an electronic device and enables the application programs to retrieve, store, and display content. The API enables application programs to communicate with other application programs and to send/retrieve content to/from other application programs. In addition, the API is configured to perform various event accounting functions. A gateway communicates with an electronic device application program via the API and is configured to retrieve content from a content server in response to receiving requests from the application programs. The gateway is configured to serve content retrieved from the content server to the electronic device, as well as to other servers and/or devices. Methods, apparatus, and computer program products are provided for dynamically selecting advertisements for use within user-requested content wherein the advertisements are stored locally within a user client device.

41 Claims, 7 Drawing Sheets

(56) References Cited

U.S. PATENT DOCUMENTS

| | | | |
|---|---|---|---|
| 5,809,242 A | 9/1998 | Shaw et al. | 395/200.47 |
| 5,848,397 A | 12/1998 | Marsh et al. | 705/14 |
| 5,933,811 A * | 8/1999 | Angles et al. | 705/14 |
| 5,948,061 A * | 9/1999 | Merriman et al. | 709/219 |
| 6,035,324 A * | 3/2000 | Chang et al. | 709/203 |
| 6,332,127 B1 * | 12/2001 | Bandera et al. | 705/14 |
| 6,385,591 B1 * | 5/2002 | Mankoff | 705/14 |
| 6,526,335 B1 * | 2/2003 | Treyz et al. | 701/1 |
| 6,567,854 B1 * | 5/2003 | Olshansky et al. | 709/229 |
| 6,757,661 B1 * | 6/2004 | Blaser et al. | 705/14 |
| 6,880,123 B1 * | 4/2005 | Landsman et al. | 715/500.1 |
| 6,883,000 B1 * | 4/2005 | Gropper | 707/10 |
| 6,892,354 B1 * | 5/2005 | Servan-Schreiber et al. | 709/203 |
| 6,925,444 B1 * | 8/2005 | McCollom et al. | 705/14 |
| 7,051,351 B2 * | 5/2006 | Goldman et al. | 725/34 |
| 7,308,254 B1 * | 12/2007 | Rissanen | 455/414.1 |
| 2001/0042249 A1 * | 11/2001 | Knepper et al. | 725/42 |

OTHER PUBLICATIONS

Dan Johnson, "Converting PC GUIs for NonPC Devices," *Circuit Cellar Ink*, Feb. 1998.

International Search Report for PCT/US01/16385.

* cited by examiner

SYSTEMS, METHODS AND COMPUTER PROGRAM PRODUCTS FOR FACILITATING DISPLAY OF CONTENT WITHIN APPLICATION PROGRAMS EXECUTING ON ELECTRONIC DEVICES

RELATED APPLICATIONS

This application claims the benefit of U.S. Provisional Application No. 60/208,943, filed May 31, 2000, the disclosure of which is incorporated herein by reference in its entirety as if set forth fully herein.

FIELD OF THE INVENTION

The present invention relates generally to content display within client devices and, more particularly, to client-side program interfaces for displaying and tracking promotional content.

BACKGROUND OF THE INVENTION

The Internet has gained broad recognition and acceptance as a viable medium for communicating and for conducting business. The World-Wide Web (Web) is comprised of server-hosting computers (Web servers) connected to the Internet that serve hypertext documents (referred to as Web pages). Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and Web pages are the prevalent forms for the Web, the Web itself refers to a wide range of protocols and Web content formats.

A Web site is conventionally a related collection of Web files that includes a beginning file called a "home" page. From the home page, a visitor can access other files and applications at a Web site. A large Web site may utilize a number of servers, which may or may not be different and may or may not be geographically-dispersed. For example, the Web site of the International Business Machines Corporation (www.ibm.com) consists of thousands of Web pages and files spread out over multiple Web servers in locations world-wide.

A Web server (also referred to as an HTTP server) is a computer program that utilizes HTTP to serve files that form Web pages to Web clients. Exemplary Web servers are International Business Machines Corporation's family of Lotus Domino® servers and the Apache server (available from www.apache.org). A Web client is a requesting program that also utilizes HTTP. A browser is an exemplary Web client for use in requesting Web pages and files from Web servers. A Web server waits for a Web client, such as a browser, to open a connection and to request a specific web page or application. The Web server then sends a copy of the requested item to the Web client, closes the connection with the Web client, and waits for the next connection.

HTTP allows a browser to request a specific item (i.e., "content"), which a Web server then returns and the browser renders. To ensure that browsers and Web servers can interoperate unambiguously, HTTP defines the exact format of requests (HTTP requests) sent from a browser to a Web server as well as the format of responses (HTTP responses) that the Web server returns to the browser. Exemplary browsers include Netscape Navigator® (America Online, Inc., Dulles, Va.) and Internet Explorer® (Microsoft Corporation, Redmond, Wash.). Browsers typically provide a graphical user interface for retrieving and viewing Web pages, applications, and other resources served by Web servers.

Unfortunately, latency problems associated with data flow over the Internet have fostered the perception that many Internet communications and transactions are slow and unreliable. Latency is the time elapsed between requesting content via a client and receiving the content from a server. Latency associated with client-server communications via the Internet may be affected by many factors such as bandwidth, Internet infrastructure, packet routing techniques, and transfer protocols. Lower latency and higher bandwidth technologies, such as optical switches and Digital Subscriber Line (DSL) technologies have been deployed to decrease perceived latency and to improve reliability associated with client-server communications. However, the dramatic increase in Internet usage worldwide may continue to offset many of the improvements in latency provided by these and other new technologies.

With the increasing mobility of today's society, the demand for mobile computing capabilities has also increased. Many workers and professionals are downsizing their laptop computers to smaller palm-top or hand-held devices, such as personal digital assistants (PDAs). In addition, many people now utilize wireless devices, such as cellular telephones, to access the Internet and to perform various other computing functions. Wireless devices may include, but are not limited to, personal digital assistants (PDAs), cellular telephones, pagers, and communicators. Many wireless devices also utilize the Microsoft® Windows® CE and 3Com Palm® Computing platforms. With the advent and development of wireless telecommunications systems and technologies, wireless Internet access is increasing worldwide. Wireless Internet access is conventionally obtained by users of wireless devices via Wireless Service Providers (WSPs).

Unfortunately, access to the Internet via wireless devices can be plagued by high latency. In general, HTTP and TCP are not optimized for the intermittent coverage, long latencies and limited bandwidth associated with wireless networks. HTTP sends its headers and commands in an inefficient text format instead of compressed binary. Wireless services using these protocols can be slow, costly, and difficult to use. Wireless security standards may require many messages to be exchanged between client and server, which, with wireless transmission latencies, may result in slow responses for users.

As the Web has evolved into a viable commercial medium, advertising has become an important source of revenue. Conventional advertising via the Internet is a client-server process, as illustrated in FIG. 1. Conventionally, a client (e.g., a Web browser or microbrowser executing on a client device 10) sends a request for content (e.g., a Web page) to a server executing on a server-hosting device (e.g., a Web server 20). The server returns the requested Web page to the client and directs the client to a separate ad server 22 in order to obtain an advertisement to be inserted within the Web page. Conventionally, a client receives the Web page and then waits for an advertisement to be served from a designated ad server for placement within the Web page.

Conventionally, Web servers impose restrictions on advertisements that prevent advertisements from being stored locally (i.e., "cached") by client devices. By preventing caching, advertisements are allowed to change and rotate independently of the content within which they are placed. For example, a client may make multiple requests for the same content; however, different advertisements may be placed within the content at each separate request.

Conventionally, Web servers invoke some logic by which advertisements are selected for inclusion within user-requested content. For example, a Web server may use information about a user making a client request and/or about a user request being made to determine what advertisement to place within user-requested content. For example, as illustrated in FIG. 2, a user makes a request 13 to a Web server 20 via a client device 10 (e.g., a personal computer, PDA, or other type of wireless device). The Web server 20 includes logic for selecting an advertisement to be included within the requested content. A selected advertisement can be retrieved from a database and returned to the client with the content (i.e., in the response 15). Alternatively, the client can be directed to make a request 17 for an advertisement from an ad server 22. The ad server 22 serves the advertisement 19 to the client for insertion within the content provided by the Web server 20.

Unfortunately, client-server communications via the Internet wherein advertisements are requested from ad servers can be plagued by high latency.

Wireless content publishers also may provide advertisements within user-requested content, often as interstitial displays within a sequence of content displays (cards). Unfortunately, advertising may increase latency as a wireless client retrieves an advertisement for insertion within user-requested content. Moreover, the use of interstitial advertising also can delay the display of subsequent content. Advertisements that induce latency are not likely to be welcomed by wireless device users or wireless device content providers.

As the use of handheld computing/communications devices increases (e.g., PDAs, pagers, cellular telephones, web-enabled radiotelephones, and/or other mobile/wireless devices), commercial entities are continuously looking for new ways to enhance revenue via the delivery of advertising and other information to users of these handheld devices.

SUMMARY OF THE INVENTION

In view of the above, embodiments of the present invention may allow content to be selected, retrieved, stored, and displayed within various electronic devices (e.g., personal computers, portable computers, handheld computers, PDAs, pagers, cellular telephones, web-enabled radiotelephones, and/or other mobile/wireless devices). An application program interface (API) is operably associated with an application program executing on an electronic device and enables the application program to retrieve, store, and display various types of content. Content may include promotional content (e.g., advertisements, electronic coupons, etc.), informational content (e.g., alerts, notifications, etc.), and any type of deliverable content (e.g., games, video content, audio content, text-based content, etc.). The term display is used to describe the presentation of the content to the user. This presentation is often visual, but may be auditory or use some other method of presentation.

The API may enable application programs to communicate with other application programs and to send/retrieve content to/from other application programs. In addition, the API may be configured to perform various event accounting functions, such as notifying another device when particular content has been displayed and/or when a user has interacted with displayed content.

According to other embodiments of the present invention, methods, apparatus, and computer program products are provided that allow application programs to incorporate advertisements and promotions within their user interface. The API provides functions for selecting and accounting for advertisements that have been used by the application, as well as communicating information with a server on the back-end. Communications functions include synchronizing a set of advertisements that can be stored locally on the device, including any constraints that may be placed on the use of the advertisements, as well as accounting for the use of the advertisements.

According to other embodiments of the present invention, advertisements and other content may be "pre-fetched" from remote servers and stored within client devices prior to requests for content in which the advertisements are to be displayed.

According to other embodiments of the present invention, an agent within a client device may be configured to dynamically select advertisements for insertion within user-requested content without requiring intervention from a remote ad server.

According to other embodiments of the present invention, the functions of content selection and display may be distributed between remote servers and the client device. In particular, the API may make request to a remote server to perform content selection. The remote server then uses a selection algorithm to choose from the set of content which it has already distributed to the client. The client can then retrieve the content from local storage instead of transferring a potentially large media file. This embodiment has the advantage of utilizing the greater potential intelligence of the remote server while still capitalizing on its local storage to eliminate the latency of media transfer.

Embodiments of the present invention can also provide the ability for content (e.g., advertisements) and/or application programs to interact with other application programs executing on a device.

Embodiments of the present invention are advantageous over conventional methodologies for delivering content (e.g., promotional content such as advertising) via the Internet to users of electronic devices. The use of local storage and retrieval can reduce actual, as well as perceived, latency associated with serving dynamically selected advertisements with user-requested content. Moreover, advertisement providers may be able to utilize advertisements having more robust graphics and larger file sizes than may otherwise be feasible, thereby enhancing advertising value. By performing advertisement selection locally and/or storing advertisements locally, the scalability of existing ad servers may be increased, thereby allowing them to efficiently respond to more client requests than otherwise possible.

Moreover, by allowing application programs to display promotional content, additional opportunities for generating and enhancing revenue are provided to content providers, as well as to device and application program manufacturers. Having local storage and intelligence on the client device also enables content display and interaction even when a device is not connected to a network (many devices do not have a permanent network connection). This is an important consideration for devices (wireless PDA, cell phones, dial-up PCs, etc.) that are not always Internet enabled.

DETAILED DESCRIPTION OF THE INVENTION

Figure 1:
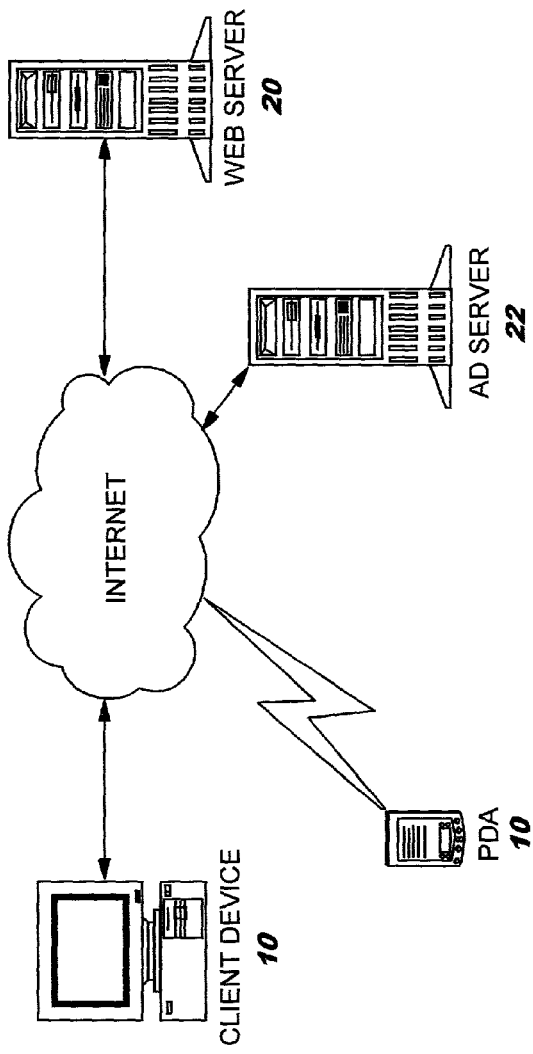
FIGS. 1 and 2 schematically illustrate conventional client-server communications associated with providing advertising within user-requested content.
Figure 2:
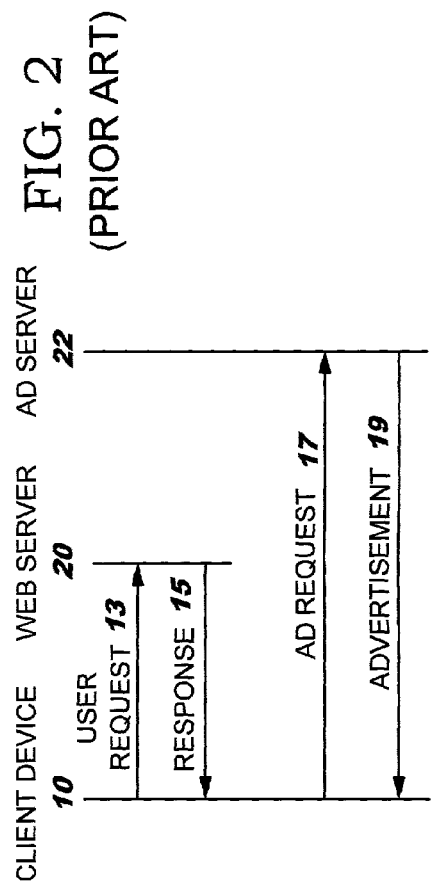

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As also will be appreciated by one of skill in the art, the present invention may be embodied as methods, data processing systems, and/or computer program products. Accordingly, the present invention may take the form of an entirely hardware embodiment, an entirely software embodiment running on general purpose hardware or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language (e.g., JAVA®, Smalltalk or C++) and/or may also be written in a conventional procedural programming language (e.g., "C") or in various other programming languages. Software embodiments of the present invention do not depend on implementation with a particular programming language. The present invention is described below with reference to block diagram and flowchart illustrations of methods, apparatus (systems) and computer program products according to embodiments of the invention.

It will be understood that each block of the block diagrams and/or flowchart illustrations, and combinations of blocks, can be implemented by computer program instructions. These computer program instructions may be provided to a processor of a general purpose computer, special purpose computer, or other data processing apparatus (e.g., personal computer, portable computer, handheld computer, PDA, pager, cellular telephone, Web-enabled radiotelephone, other mobile/wireless device) to produce a machine, such that the instructions, which execute via the processor of the computer or other data processing apparatus, create structures for implementing the functions specified in the block diagram and/or flowchart block or blocks. Each block, and combinations of blocks, can be implemented by a device which performs the specified functions or steps, or combinations of hardware and computer instructions.

These computer program instructions may also be stored in a computer-readable memory that can direct a computer or other data processing apparatus to function in a particular manner, such that the instructions stored in the computer-readable memory produce an article of manufacture including instructions which implement the function specified in the block diagram and/or flowchart block or blocks.

The computer program instructions may also be loaded onto a computer or other data processing apparatus to cause a series of operational steps to be performed on the computer or other apparatus to produce a computer implemented process or method such that the instructions which execute on the computer or other apparatus provide steps for implementing the functions specified in the block diagram and/or flowchart block or blocks.

It should be noted that, in some alternative embodiments of the present invention, the functions noted in the blocks may occur out of the order noted in the figures. For example, two blocks shown in succession may in fact be executed substantially concurrently or the blocks may sometimes be executed in the reverse order, depending on the functionality involved. Furthermore, in certain embodiments of the present invention, such as object oriented programming embodiments, the sequential nature of the flowcharts may be replaced with an object model such that operations and/or functions may be performed in parallel or sequentially.

Figure 3A:
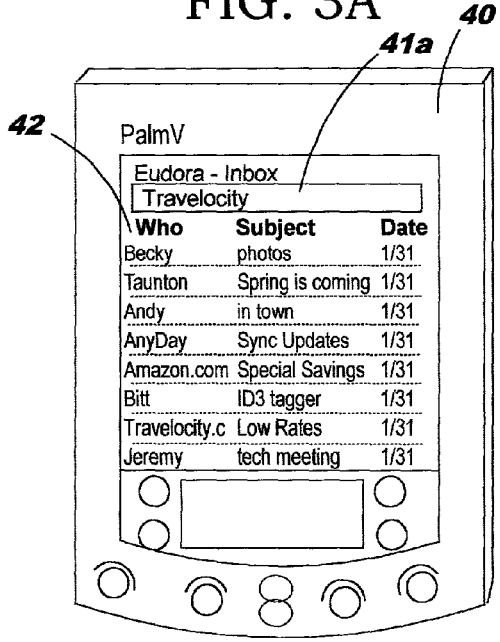
FIGS. 3A-3B illustrate a handheld electronic device having an API according to embodiments of the present invention that facilitates the selection, retrieval, storage, and display of content within application programs executing therewithin.
Figure 3B:
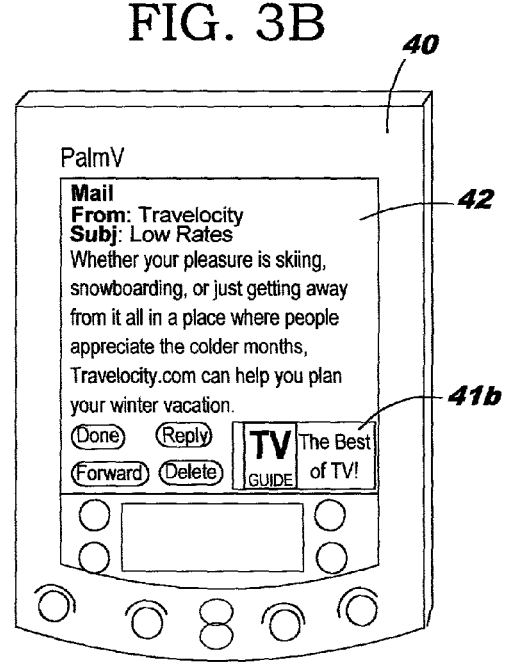

Referring to FIGS. 3A-3B, a handheld computer 40 is illustrated with an e-mail application program executing therewithin. An application program interface (API) is operably available to the e-mail application program and enables the e-mail application program to select, retrieve, store, and display content 41a, 41b, as will be described below.

As known to those skilled in the art, an API is a method prescribed by a computer system by which a programmer writing an application program can make requests of the system or another application program. The API according to embodiments of the present invention enables the e-mail application program 42 (as well as other application programs, such as browsers, etc.) to select and retrieve content from a local database that contains information retrieved from remotely located content servers, display the retrieved content, and perform various event (e.g., impressions and/or user interactions) accounting functions (e.g., ad servers, etc.).

Figure 4:
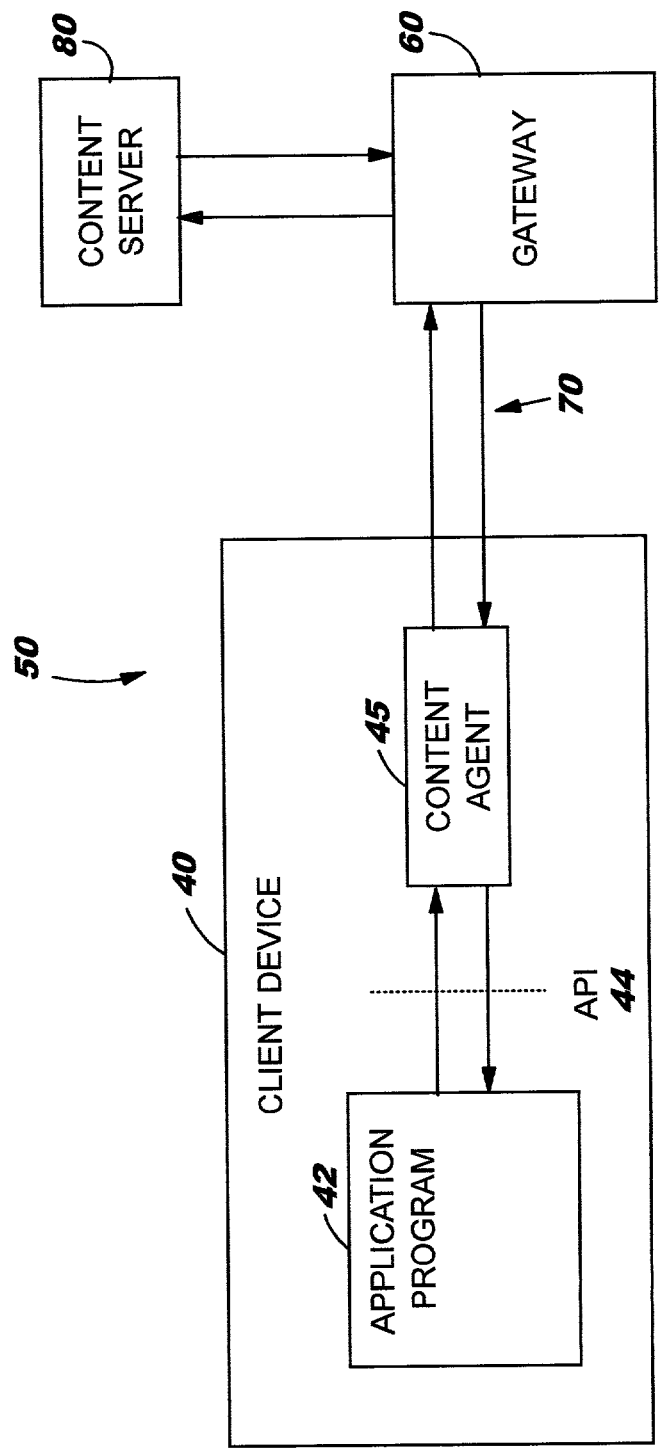
FIG. 4 illustrates a system that facilitates the selection, retrieval, storage, and display of promotional content within various electronic devices, according to embodiments of the present invention.

Referring now to FIG. 4, a system 50 that facilitates the selection, retrieval, storage, and display of various types of content (e.g., promotional content, etc.) within various devices (e.g., handheld devices, etc.), according to embodiments of the present invention, is schematically illustrated. The term "content" includes, but is not limited to, promotional content, informational content, text-based content, audio content, video content, etc. The illustrated system 50 includes a client device 40 that can communicate with a content server 80 that is configured to serve packages of content, such as advertising and/or electronic coupons (e.g., an ad server). These communications may be direct or through an intermediate gateway 60. The communications occur via a communications network 70, where the connectivity of the client device may be transient in nature (i.e., it is not required to have permanent network connections).

The client device 40 may be virtually any type of electronic device that can communicate (at least occasionally) with other devices via a communications network including, but not limited to, personal computers, portable computers, hand-held computers/devices, PDAs, pagers, cellular telephones, Web-enabled radiotelephones, and/or other mobile/wireless devices. The client device 40 includes an application program 42, and an API 44 operably available to the application program 42 and with a content agent 45 that enables the application program 42 to retrieve content from the content server 80 and store it locally. Communications between the content agent 45 and content server 80 are illustrated as going through the gateway 60; however, it is understood that this is not required. Content agent 45 may communicate directly with a content server 80. An agent is a program that gathers information and/or performs some service. Agents are well understood by those of skill in the art and need not be described further herein.

The API 44 preferably includes logic for communicating with the gateway 60 (and/or directly with the content server 80), logic for selecting and retrieving content from the content server 80, potentially via the gateway 60, and for storing (caching) the content within the client device 40. The API 44 may include logic for selecting content stored within the client device 40 for display by the executing application program 42. The API 44 may include logic for processing user responses to content displayed by the application program 42. The API 44 may include accounting logic for notifying the content server 80 about content displayed by the application program and about user interactions with displayed content.

When the device 40 is offline (i.e., without a connection to the network 70), the API 44 accesses information stored locally at the content agent 45. The content agent is capable of returning content pre-fetched from a content server 80. The caching agent 45 is also capable of storing and accumulating accounting data thru the API 44.

When the device is online (i.e., with a connection to the network 70), the content agent 45 may pre-fetch content from the content server 80 (potentially through a gateway 60) to be stored locally. The caching agent 45 may also transfer previously accumulated accounting information to the content server 80.

The gateway 60, if present, is configured to communicate with the client content agent 45. The gateway 60 is configured to retrieve content from the content server 80 in response to receiving requests from the content agent 45, usually at the request of application program 42 through the API 44. The gateway 60 is configured to serve content retrieved from the content server 80 to the client device 40.

Figure 5:
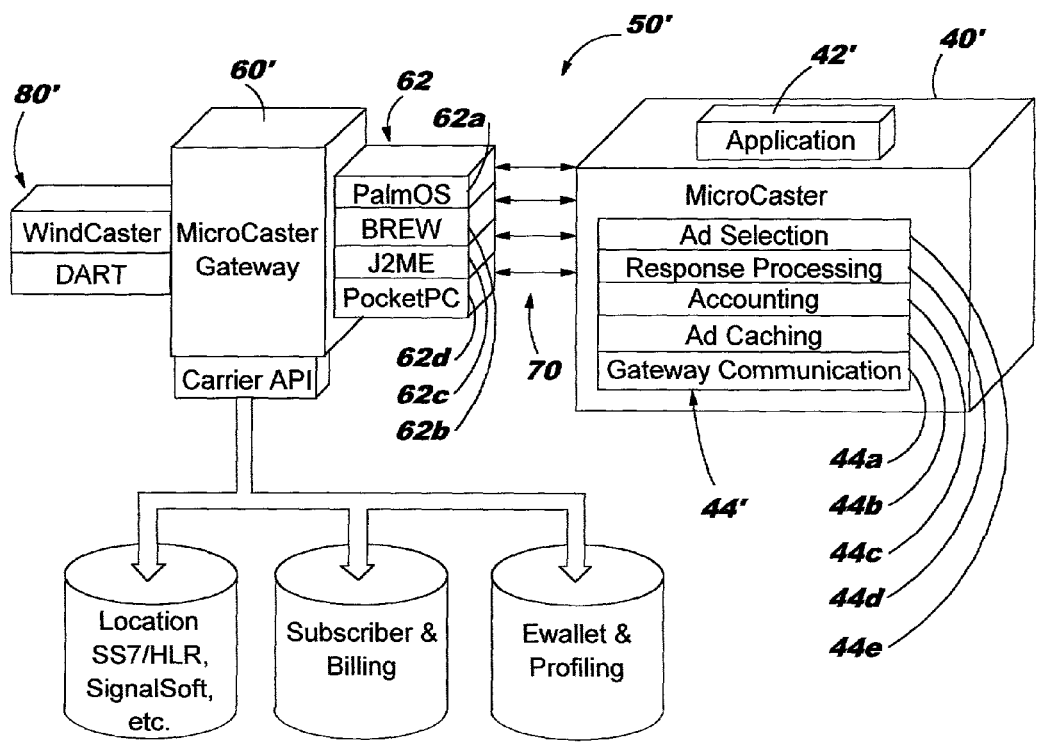
FIG. 5 illustrates a specific implementation of the system of FIG. 4 that facilitates the selection, retrieval, storage, and display of promotional content within various electronic devices, according to embodiments of the present invention.

Referring now to FIG. 5, a specific implementation of the system 50 of FIG. 4 is illustrated. In FIG. 5, a system 50' that facilitates the selection, retrieval, storage, and display of promotional content within various client devices, according to embodiments of the present invention, is schematically illustrated. It is understood that the term "promotional content" includes, but is not limited to, advertisements, electronic coupons, and the like. The illustrated system 50' includes a client device 40' that can communicate with a gateway 60' via a communications network 70, and one or more promotional content servers 80' (e.g., ad servers) that are configured to serve packages of promotional content, such as advertising and/or electronic coupons.

The client device 40' may be virtually any type of electronic device that has the ability to intermittently communicate with other devices via a communications network including, but not limited to, personal computers, wireless communications devices, radiotelephones, PDAs, hand-held computers/devices, Web-enabled phones, and the like. The client device 40' includes an application program 42' configured to display promotional content during execution thereof, and an API 44' operably available to the application program 42' that enables the application program 42' to select and retrieve promotional content from the content agent 40'.

The illustrated API 44' includes logic 44a for communicating with the gateway 60', logic 44b for retrieving promotional content from one or more of the promotional content servers 80' via the gateway 60' and for storing (caching) the promotional content within the client device 40'. The retrieval and caching logic 44b may be configured to specify restrictions on promotional content, such as size and number of promotional content units in packages of promotional content served by the promotional content server 80'. The retrieval and caching logic 44b may also be configured to select and retrieve content based on various user preferences and/or device preferences.

The illustrated API 44' includes logic 44e for selecting promotional content stored within the client device 40' for display by the executing application program 42'. The illustrated API 44' includes logic 44d for processing user responses to promotional content displayed by the application program 42'. For example, the user response logic 44d can be configured to display content (e.g., previously cached content) in response to user activation of promotional content displayed within the executing application program 42'.

The illustrated API 44' also includes accounting logic 44c for notifying the promotional content servers 80' (or other devices) about promotional content displayed by the application program. The accounting logic 44c is preferably configured to track impressions (i.e., each time particular promotional content is displayed) and interactions (i.e., each time a user "clicks" on particular displayed promotional content).

The illustrated gateway 60' is configured to communicate with the application program 42' via the client device API 44'. The gateway 60' is configured to select and retrieve promotional content from one or more of the promotional content servers 80' in response to receiving requests from the application program 42'. The gateway 60' is configured to serve promotional content retrieved from one of the promotional content servers 80' to the client device 40'.

The illustrated gateway 60' includes a plurality of server-side components 62 that are configured to communicate with client devices operating on specific platforms. For example, client devices operating on the Palm OS platform will communicate with the gateway 60' via server-side component 62a. Similarly, client devices operating on the BREW platform will communicate with the gateway 60' via server-side component 62b; client devices operating on the J2ME platform will communicate with the gateway 60' via server-side component 62c; and client devices operating on the PocketPC platform will communicate with the gateway 60' via server-side component 62d. In addition, the server-side components 62 are configured to convert the format of promotional content retrieved from the promotional content servers 80' into formats compatible with a respective client device 40'.

The illustrated gateway 60' also provides an open API for carriers that enables them to interact with subscriber databases, location information services, and e-wallet and payment services.

Figure 6A:
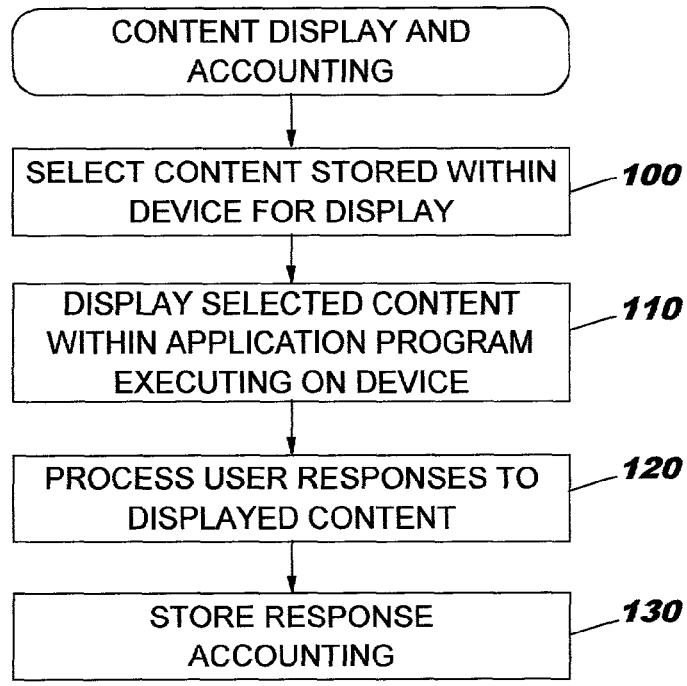
FIGS. 6A-6B are flowcharts that illustrate operations for local content displaying and accounting (FIG. 6A) and for communicating with a remote content (or other) server (FIG. 6B), according to embodiments of the present invention.
Figure 6B:
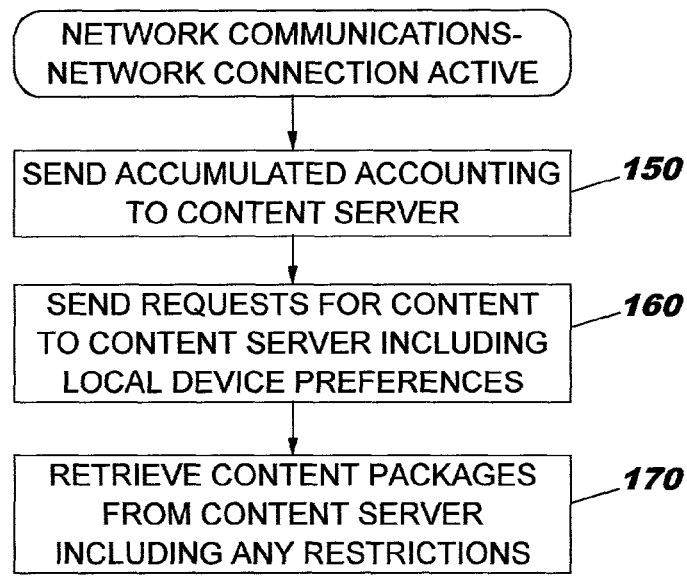

Referring now to FIGS. 6A-6B, various operations performed by an agent on a client device in accordance with embodiments of the present invention will be described. Referring to FIG. 6A, operations for displaying content within an application program executing within a device, according to embodiments of the present invention, are illustrated. An API within a device selects content stored within the device for display by an application program executing on the device (Block 100). The selected content is displayed within the application program (Block 110). User responses to the displayed content are processed (Block 120). For example, cached content may be displayed to a user in response to user activation of content displayed within an executing application program. Information regarding content that was displayed and/or interacted with by a user is stored for later transmittal to a content server (Block 130).

Referring now to FIG. 6B, when a device has an active network connection, it communicates its locally collected accounting data (e.g., information about what has been displayed and what has been interacted with by a user) to a remote server (Block 150). The device also sends a request to a remote server for additional content, including in the request any local preferences or profile information that are relevant (Block 160). The device then receives a response from a remote server consisting of one or more packages of content as well as any restrictions on the use of that content (i.e., time of day, frequency control, etc.) (Block 170).

Table 1 below illustrates an exemplary subset of API calls that a developer using JAVA® could use to fetch promotional content, display the promotional content and then handle user responses to the displayed promotional content, according to embodiments of the present invention.

TABLE 1

| API Call | Purpose |
| --- | --- |
| public boolean sync(String spotId); | Get a package of ads. |
| public byte [] getAd (String spotId); | Select one of the ads in the package. |
| public byte [] getClickThroughResponse(); | Get the click-through for that ad. |

EXAMPLE 1

A handheld device application program contacts a gateway to request a package of ads for a specific inventory item. The application program may start with a splash screen that shows an ad. That splash screen would be represented in an ad serving solution as a spot or site—just like a banner ad content element on a web site.

A gateway fulfills the request by contacting the specified ad server and forwarding the delivery request to the ad server. The ad server responds to the gateway by serving a document that describes everything the handheld device needs to cache, render and account for. In the example document below, media refers to a specific creative item. A media element can be a binary file or text. It can also specify a URL to use for the user's responses to the ad. An example ad package could look like this:

```
<!DOCTYPE maml PUBLIC '-//WAPFORUM//DTD WML 1.1//EN'
'http:///maml.dtd'>
<microcaster>
    <media-set>
        <media id='98'
mediaURL='http://ad.server.net/media/1/0/98_markup.txt'
redirectURL='http://www.host.com/exec/order?product=<id>'
                        altResponse=''/>
    </media-set>
    <placement-set>
        <ad-placement id='75'
                        server='windcaster'
                        media='98'
                        maxImpressions='0'/>
    </placement-set>
</microcaster>
```

At some point after the application program has delivered impressions for a set of ads it will contact the gateway to upload accounting information to the underlying ad server. Accounting information includes the id of an ad placement, a number of impressions delivered, the number of responses from users and, optionally, the device id of the user.

The format of an exemplary accounting message that is sent to the ad server is as follows:

```
<!DOCTYPE maml PUBLIC '-//WAPFORUM//DTD WML 1.1//EN'
'http://ad.windcaster.com/DTDs/maml.dtd'>
<microcaster>
    <accounting>
        <ad-placement  id='<Id>'
                        deviceId='<dId>'
                        spot='<spotId>'
                        impressions='<n>'
                        responses='<m>'/>
    </accounting>
</microcaster>
```

EXAMPLE 2

Figure 7:
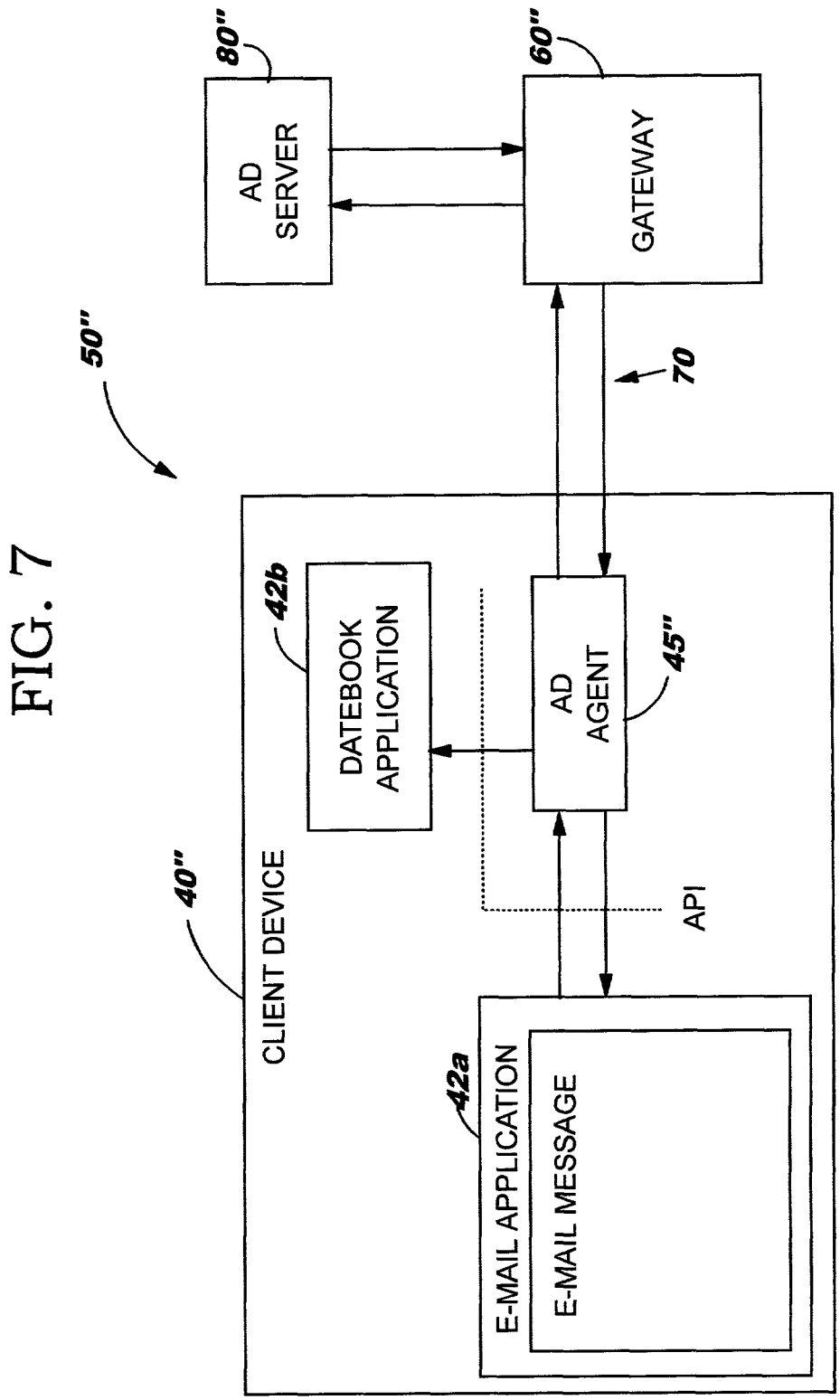
FIG. 7 illustrates a specific implementation of the system of FIG. 4 that facilitates the sharing of content among two or more application programs executing (or executable) on an electronic device, according to embodiments of the present invention.

FIG. 7 illustrates another specific implementation of the system 50 of FIG. 4. In FIG. 7, a system 50" is provided that facilitates the sharing of content among two or more application programs 42*a*, 42*b* executing (or executable) on a client device 40". The illustrated system 50", includes a client device 40" that can communicate with a gateway 60" via a communications network 70, and an ad server 80" that is configured to serve promotional content, such as advertising and/or electronic coupons.

The client device 40" includes an e-mail application program 42*a* and a datebook application program 42*b*. When the e-mail application program 42*a* receives promotional content containing information about an upcoming event, the e-mail application program 42*a* can interface with the datebook application program 42*b*, via an ad agent 45", and store information about the upcoming event therein. For example, if promotional content displayed by the e-mail application program 42*a* contained a date for an upcoming event, this date could be sent to the datebook application 42*b*, automatically.

EXAMPLE 3

Figure 9:
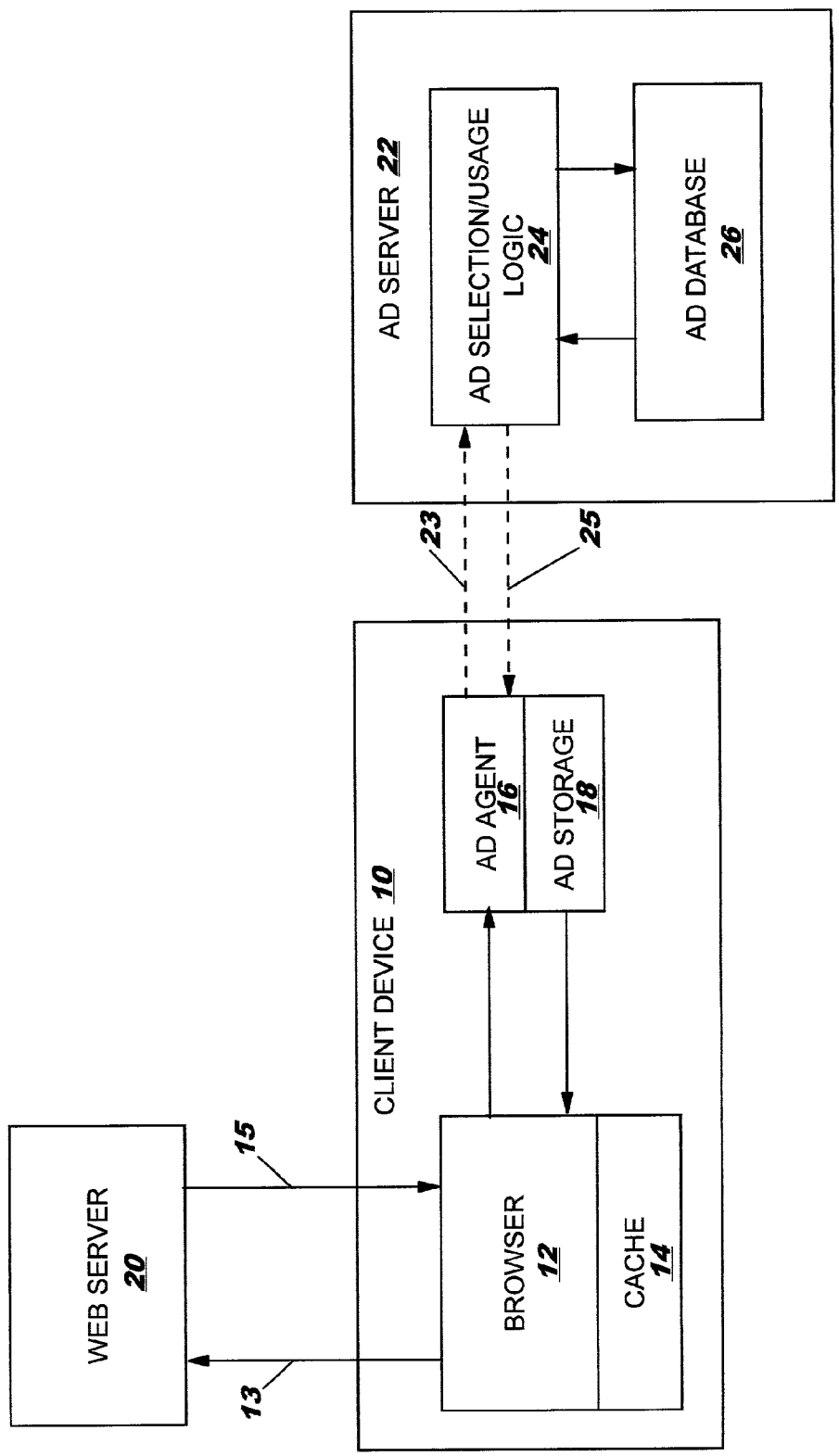
FIG. 9 is a block diagram representation of a client device having a local ad agent according to embodiments of the present invention, wherein the ad agent is used to select an advertisement, and wherein the local ad agent is configured to retrieve the selected advertisement from local storage within the client device.

Referring now to FIG. 9, a block diagram is provided that illustrates a client device 10 having an ad agent 16 executing therewithin according to embodiments of the present invention. The client device 10 may be, but is not limited to, a personal computer, portable computer, handheld computer/device, PDA, pager, cellular telephone, web-enabled radio-telephone, and/or other mobile/wireless device. The client device 10 includes a Web browser 12 and cache 14 associated therewith. The client device 10 also includes local ad storage (e.g., cache and/or other nonvolatile memory) 18 for storing ads downloaded from remote sources (e.g., ad servers).

In the illustrated embodiment of FIG. 9, a user, via the client device Web browser 12, has made a request 13 to a Web server 20 for content. The Web server 20 serves a response 15 to the user request that includes the requested content and a hyperlink that indicates the browser should retrieve the information from the local ad agent 16.

According to the illustrated embodiment of FIG. 9, the Web browser 12, upon receiving the response 15 from the Web server 20, invokes the ad agent 16 within the client device 10 to contact the ad server 22 identified in a link returned in the server response 15. The ad agent 16 sends a request 23 to the ad selection/usage logic 24 of the ad server 22 and receives an identification 25 of an advertisement that should be inserted within the content in the Web server response 15. Using the received advertisement identification 25, the ad agent 16 retrieves the identified advertisement from local ad storage 18 within the client device 10. As such, the transaction with the ad server results in selection of an advertisement, but not a download of the advertisement. Because an advertisement file size is typically much larger than the file size of an identifier, significant savings in time and bandwidth can be realized via the present invention.

Invocation of the ad agent 16 by the Web browser 12 can occur by various mechanisms. For example, an ad agent protocol identifier (e.g., adagent://ad.adserver.com/XXX) may be utilized as a "link" to local ad storage instead of a conventional URL to an actual ad server (e.g., a URL preceded by "http"). Alternatively, a locally stored advertisement may be identified using a URL such as "localhost/adagent?ad.adserver.com/XXX". However, it is understood that various methodologies of routing an advertisement request to an ad agent may be utilized in accordance with embodiments of the present invention.

Figure 8:
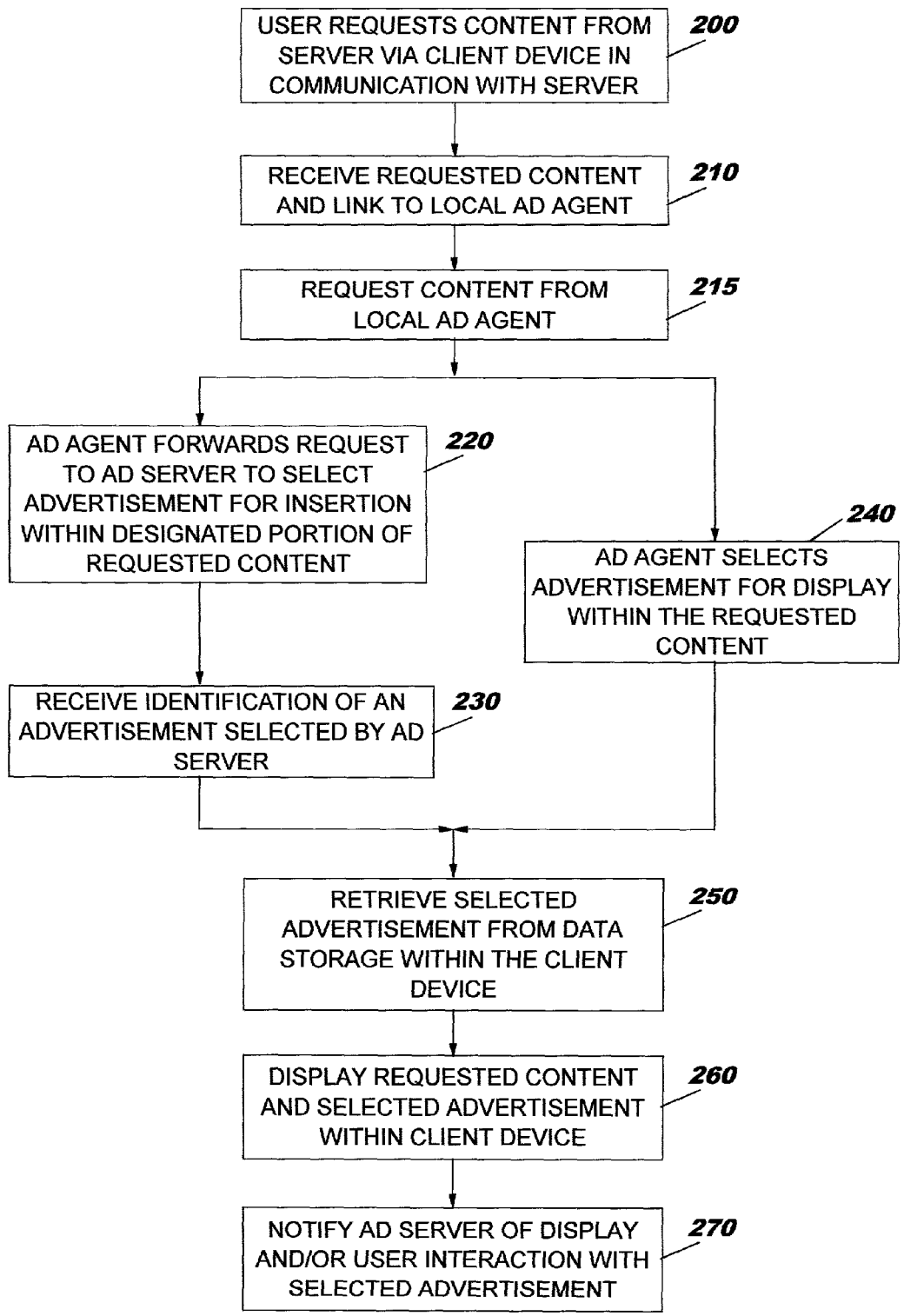
FIG. 8 is a flowchart that illustrates operations for displaying promotional content, such as advertisements and/or electronic coupons, within an application program executing within an electronic device, according to embodiments of the present invention

Referring now to FIG. 8, a flow chart is provided describing the operations of FIG. 9. Initially, a user, via a client device having a browser (e.g., a Web browser or microbrowser executing therewithin), requests content (e.g., a Web page) from a server (e.g., a Web server) in communication with the client device via a network (e.g., the Internet or an intranet) (Block 200). Exemplary client devices may include, but are not limited to, personal computers, portable computers, hand-held computers/devices, PDAs, pagers, cellular telephones, web-enabled radiotelephones, and/or other mobile/wireless devices.

The client device receives from the server the requested content and a link to a remote ad server that directs the client to request a dynamically selected advertisement from the local ad agent (Block 210). Dynamic advertisement selection via ad servers is well known to those of skill in the art and need not be described further herein. Also understood by those skilled in the art, user requested content may include one or more portions designated to receive dynamically selected advertisements therewithin. Upon receiving an identifier of the advertisement from the local ad agent, a client inserts the advertisement within a designated portion of the requested content and displays the content and advertisement via a display.

According to embodiments of the present invention, upon receiving a link to a local ad agent with the requested content (Block 210), the client requests the information from the local ad agent (Block 215). In the illustrated embodiment, the ad agent on the client device is configured to pass that request to a remote ad server, where the ad server selects an advertisement for insertion within the designated content portion (Block 220). Upon receiving an identification of an advertisement selected by the ad server (Block 230), the ad agent retrieves the selected advertisement from data storage within the client device (Block 250), and returns it to the browser where the requested content and selected advertisement are displayed within the client device (Block 260).

An ad agent according to embodiments of the present invention may also be configured to notify a remote ad server of display and/or user interaction with a selected advertisement (Block 270). In addition, advertisements stored within a client device preferably are prefetched from a source, such as a remote ad server, prior to a user requesting content from a server via the client device. For example, advertisements may be downloaded and stored on a wireless device, such as a PDA, when the wireless device is connected to a networked computer (i.e., a computer that is connected to the Internet and/or other network) for synchronization. Likewise, notification of user interaction or display of an advertisement can also happen when the wireless device is connected to the network.

According to other embodiments of the present invention, an ad agent within a client device may be configured to perform ad selection locally for insertion within user-requested content. For example, upon receiving a link to an ad server with user-requested content, a client device may request an ad agent to select an advertisement from local storage, in lieu of sending a request to the identified ad server to select an advertisement (Block 240). Upon selecting an advertisement, the ad agent retrieves the selected advertisement from local storage within the client device (Block 250), and displays the requested content and selected advertisement within a display of the client device (Block 260), as described above.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A mobile telecommunication device enabled for communication with a content server through a wireless communication network, the mobile telecommunication device comprising:
  an ad agent executing on the mobile telecommunication device, wherein said ad agent is capable of storing a plurality of items of promotional content received without a request for user requested content, and wherein said ad agent is enabled for communication with a wireless communication network and configured to dynamically associate at least one promotional content from the ad agent with user requested content containing a link to the local ad agent from an application executing at the mobile telecommunication device, based on an identifier received from a remote ad server, and wherein the at least one promotional content is related to the user requested content.

2. The mobile telecommunication device according to claim 1, where the first application further comprises an application program interface operable to receive the plurality of items of promotional content from the content server in response to requests from the application program.

3. The mobile telecommunication device according to claim 2, wherein the application program interface is operable to receive the plurality of items of promotional content from the content server in response to requests from the application program wherein a first format of the plurality of items of promotional content is converted into a second format compatible with the mobile telecommunication device by a specialized gateway.

4. The mobile telecommunication device according to claim 2, wherein the plurality of items of promotional content are included in packages of content units.

5. The mobile telecommunication device according to claim 4, wherein the application program is configured to specify a restriction on content units in at least one of the packages.

6. The mobile telecommunication device according to claim 5, wherein the restriction comprises a limitation on at least one of a size and-number of promotional content units in a package.

7. The mobile telecommunication device according to claim 5, wherein the restriction comprises at least one of a user preference and a mobile telecommunication device preference.

8. The mobile telecommunication device according to claim 2, wherein the application program interface comprises storage logic for retrievably storing promotional content within the mobile telecommunication device.

9. The mobile telecommunication device according to claim 2, wherein the application program interface comprises content selection logic for selecting promotional content stored within the mobile telecommunication device for display by the second application program.

10. The mobile telecommunication device according to claim 2, wherein the application program interface comprises user response logic for processing user responses to promotional content displayed by the application program.

11. The mobile telecommunication device according to claim 10, wherein the user response logic comprises content display logic for displaying promotional content in response to user activation of content.

12. The mobile telecommunication device according to claim 1, wherein the promotional content comprises content selected from the group consisting of advertisements, electronic coupons, and notifications.

13. The mobile telecommunication device according to claim 1, wherein the server comprises a promotional content server.

14. The mobile telecommunication device according to claim 1, wherein the mobile telecommunication device comprises any of a cellular phone and personal digital assistant.

15. The mobile telecommunication device according to claim 1, wherein the first application is further configured to collect and store accounting data locally on the mobile telecommunication device, and communicate the accounting data to the content server when the mobile telecommunication device is online, wherein the accounting data comprises a tracked value for each time a particular promotional content is displayed, a tracked value for each time a user selects a displayed promotional content, and a value indicative of placement within the second application for each of the at least one promotional content displayed within the second application.

16. The mobile telecommunication device according to claim 1, wherein the first application is further configured to request additional promotional content independent of the user requested content from an the ad server for storage on the volatile memory local storage when the mobile telecommunication device is online, wherein the request is transmitted with local preferences of the mobile telecommunication device.

17. The mobile telecommunication device according to claim 16, wherein the application program interface comprises notification logic for notifying a server about promotional content displayed by the application program.

18. The mobile telecommunication device according to claim 16, wherein the application program interface comprises notification logic for notifying a server about user interaction with promotional content displayed by the application program.

19. The mobile telecommunication device according to claim 16, wherein the application program interface tracks impressions and interactions associated with promotional content.

20. A method of providing dynamically selected advertising within content requested by a mobile telecommunication device enabled for wireless communication through a wireless communication network, the method comprising the following steps performed by the mobile telecommunication device:
   requesting content from a content server, when a mobile telecommunication device is enabled for communication with a wireless communication network;
   receiving the requested content from the content server and a link to an ad agent executing on the mobile telecommunication device, wherein the requested content includes a portion designated to receive a dynamically associated advertisement there within, and wherein the link is configured to cause the ad agent to request an advertisement identifier from the ad server;
   requesting the advertisement identifier from the ad server;
   receiving the advertisement identifier from the ad server;
   selecting an advertisement with the advertisement identifier from an ad agent executing on the mobile telecommunication device, wherein the mobile telecommunication device is online, wherein the ad agent is configured to dynamically select an advertisement for display within the requested content;
   combining the dynamically selected advertisement for display within the requested content at the mobile telecommunication device; and
   transferring locally collected accounting data and retrieving additional advertisements for local storage on the mobile telecommunication device responsive to connecting to or synchronizing with a network connection, wherein the accounting data comprises a tracked value for each time a particular promotional content is displayed, a tracked value for each time a user selects a displayed promotional content, and a value indicative of placement within the second application for each of the at least one promotional content displayed within the second application.

21. The method according to claim 20, wherein requesting content from a server is preceded by: retrieving one or more advertisements from an ad server when the mobile telecommunication device is online; and storing the retrieved one or more advertisements within the mobile telecommunication device.

22. The method according to claim 20, wherein the content is a Web page.

23. The method according to claim 20, wherein displaying the requested content and selected advertisement is followed by notifying the ad server of usage of the selected advertisement.

24. The method according to claim 20, wherein the combined requested content and selected advertisement is displayed on the mobile telecommunication device.

25. The method according to claim 20, wherein locally collected accounting data and retrieving additional advertisements for local storage on the mobile telecommunication device is transferred responsive to connecting to or synchronizing with a network connection.

26. A computer program product that provides dynamically selected advertising within content requested by a mobile telecommunication device enabled for wireless communication through a wireless communication network, the computer program product comprising a computer usable non-transitory storage medium having computer readable program code embodied in the medium, the computer readable program code comprising:
    computer readable program code that requests content from a content server;
    computer readable program code that receives the requested content from the content server and a link to an ad agent executing on the mobile telecommunication device, wherein the requested content includes a portion designated to receive a dynamically selected advertisement there within, and wherein the link is configured to cause the ad agent to request an advertisement from a remote ad server when the mobile telecommunication device is online;
    computer readable program code that sends a request for an advertisement identifier to the remote ad server;
    computer readable program code that receives an identifier of an advertisement selected by the ad server;
    computer readable program code that dynamically selects an advertisement with the advertisement identifier from the ad agent executing on the mobile telecommunication device;
    computer readable program code that displays the requested content and selected advertisement via a display of the mobile telecommunication device;
    computer readable program code that displays additional content in response to a selection of the advertisement, wherein the additional content was stored in a memory of the mobile telecommunication device prior to the request of the content; and
    computer readable program code that transfers locally collected accounting data and retrieves additional advertisements for local storage on the mobile telecommunication device responsive to connecting to or synchronizing with a network connection.

27. The computer program product according to claim 26, further comprising:
    computer readable program code that retrieves one or more advertisements from an ad server; and
    computer readable program code that stores the retrieved one or more advertisements within the mobile telecommunication device.

28. The computer program product according to claim 26, wherein the content is a Web page.

29. The computer program product according to claim 26, further comprising computer readable program code that notifies the ad server of usage of the selected advertisement.

30. The computer program product according to claim 26, wherein the mobile telecommunication device is a handheld wireless device.

31. A mobile telecommunication device operable to be in communication with a remote advertisement server over a wireless communication network, the mobile telecommunication device comprising:
    an ad agent executing at the mobile telecommunication device operable for storing a plurality of items of promotional content; and
    wherein the ad agent is operable to select at least one of the plurality of items of promotional content in response to the selection of user-requested content and further in response to receiving an identifier from the remote advertisement server generated in response to a selection algorithm executed by the remote advertisement server, wherein the plurality of items of promotional content are stored at the ad agent prior to the selection of the user-requested content and wherein the user-requested content includes a link to the ad agent executing at the mobile telecommunication device.

32. The mobile telecommunication device of claim 31, wherein the mobile telecommunication device further includes decision logic operable to be executed by the mobile telecommunication device in response to a constraint related to the time of day that the user-requested content is selected and a constraint related to the frequency at which an item of promotional content is intended to be displayed.

33. The mobile telecommunication device of claim 31, wherein the mobile telecommunication device is operable to redirect to the application program a request for promotional content originally directed to an advertisement server, the request being generated in response to the selection of user-requested content.

34. The mobile telecommunication device of claim 31, wherein the mobile telecommunication device is operable to request additional promotional content from the server when user-requested content is not being selected.

35. The mobile telecommunication device of claim 31, wherein the decision logic is operable to be executed in response to a constraint related to the size of an item of promotional content.

36. The mobile telecommunication device of claim 31, wherein the decision logic is operable to be executed in response to a constraint related to the number of items of promotional content.

37. The mobile telecommunication device of claim 31, wherein the decision logic is operable to be executed in response to information related to a user of the mobile telecommunication device.

38. A mobile telecommunication device enabled for wireless communication with a content server through a wireless communication network and for sharing data between two or more applications resident on the mobile telecommunication device, the mobile telecommunication device comprising:
    an ad agent executing at the mobile telecommunication device operable for storing a plurality of items of promotional content, wherein said ad agent is enabled for communication with a wireless communication network, and wherein the ad agent is configured to request an identifier of promotional content from a remote ad server when the mobile telecommunication device is online, wherein the request is transmitted with local preferences or profile information, and wherein the ad agent is operable to dynamically associate at least one of the plurality of items of promotional content from the ad agent in to a first application executing at the mobile telecommunication device, using constraints stored on the ad agent, in response to receiving the identifier from the remote ad server; and a second application at the mobile telecommunication device, wherein the first application transfers data from the dynamically selected at least one of the plurality of items of promotional content to the second application via the ad agent for processing by the second application.

39. The mobile telecommunication device of claim 38, wherein the second application is a calendar application.

40. The mobile telecommunication device of claim 38, wherein the data comprises information for an event.

41. The mobile telecommunication device of claim 38, wherein the first application further comprises an application program interface operable to receive the plurality of items of promotional content from the content server in response to requests from the application program.

* * * * *